United States Patent
Amberg

[15] 3,658,615
[45] Apr. 25, 1972

[54] TWO-PIECE PLASTIC CONTAINERS HAVING FOAMED THERMOPLASTIC SIDE WALL AND METHOD OF MAKING SAME

[72] Inventor: Stephen W. Amberg, St. James, N.Y.
[73] Assignee: Owens-Illinois, Inc., Toledo, Ohio
[22] Filed: Mar. 28, 1969
[21] Appl. No.: 835,836

Related U.S. Application Data

[62] Division of Ser. No. 637,304, May 9, 1967, Pat. No. 3,468,467.

[52] U.S. Cl............................156/218, 93/36 MM, 93/36 PC, 93/36.5 R, 93/55.1 R, 156/203, 156/215, 156/227, 264/53, 264/321
[51] Int. Cl..........................................................B29d 23/10
[58] Field of Search...............156/226, 227, 218, 203, 215, 156/77, 78; 93/36, 36.5, 36.6, 36.7, 36.8, 36.9, 55.1; 264/53, 321

[56] References Cited

UNITED STATES PATENTS

| 2,104,535 | 1/1938 | Barbieri | 93/36.5 X |
| 2,286,692 | 6/1942 | Smith | 93/36.5 |
| 3,344,222 | 9/1967 | Shapiro et al. | 264/321 |
| 3,364,825 | 1/1968 | Baumgartner | 93/36 |
| 3,439,590 | 4/1969 | Rosenberg et al. | 93/55.1 |
| 3,444,282 | 5/1969 | Burkett | 264/321 X |

Primary Examiner—Benjamin A. Borchelt
Assistant Examiner—G. E. Montone
Attorney—Brooks, Haidt & Haffner

[57] ABSTRACT

A two-piece plastic container is fabricated by selecting a sheet of expanded plastic material having an integral skin, the skin having a density approaching that of the basic unfoamed plastic, while the intermediate body of foamed plastic has a relatively low density of the order of 11-14 lbs./cu.ft. and a cell size of from about 0.2 to about 0.3 mm., the overall thickness of the sheet being about 0.030 inch to about 0.050 inch. Blanks are cut from the aforesaid sheet, treated with a solvent along the margins at the bottom and end, and folded around a mandrel to bring opposite ends into overlapping position with the solvent therebetween whereupon the overlapped ends are pressed together to form a seam. A bottom member is solvent sealed to the bottom edge of the side wall blank.

6 Claims, 5 Drawing Figures

Patented April 25, 1972
3,658,615
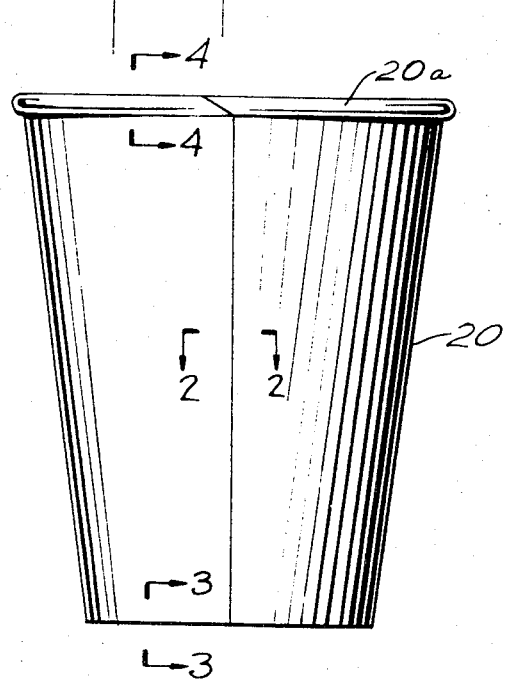
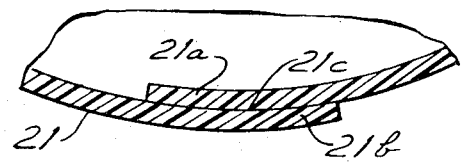
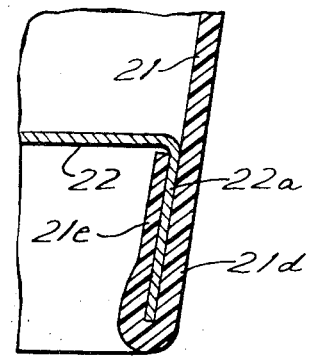
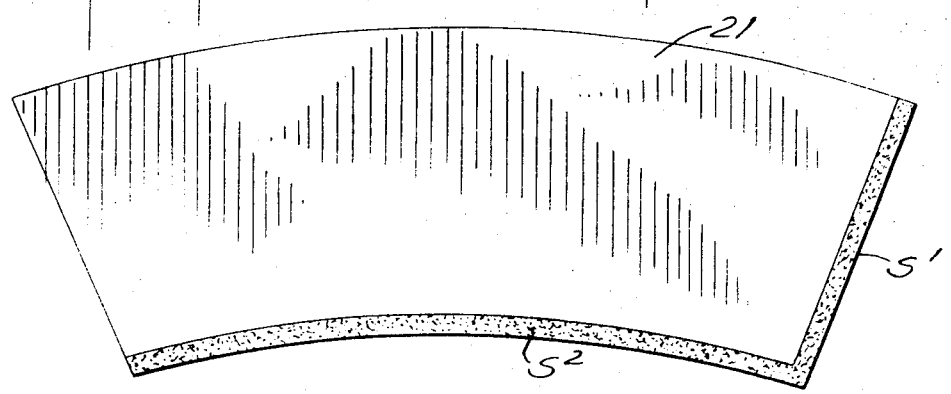
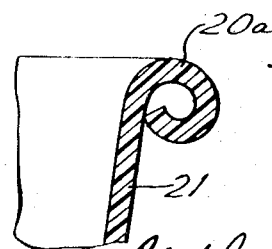
INVENTOR.
STEPHEN W. AMBERG
BY
Ward, McElhannon, Brooks & Fitzpatrick
ATTORNEYS

TWO-PIECE PLASTIC CONTAINERS HAVING FOAMED THERMOPLASTIC SIDE WALL AND METHOD OF MAKING SAME

This application is a division of my copending application Ser. No. 637,304, filed May 9, 1967.

BACKGROUND OF THE INVENTION

Heretofore, plastic foam containers were made in one piece comprising continuous side wall and bottom. These fall into two general categories: (1) those thermoformed from a sheet of plastic foam material, see for example, Lux et al. U.S. Pat. No. 3,260,781, July 12, 1966, and (2) those formed by casting or the like from foamable plastic granules or pellets, see for example, Smucker et al. U.S. Pat. No. 3,162,705, Dec. 22, 1964.

Due to the inherent manner of making such one-piece containers, the plastic foam material was thermoformed into the desired shape while at a temperature of about 176° F. (80°C.) and the resultant formed cups were subject to deformation due to shrinkage. In an effort to overcome this, it was proposed to subject the plastic foam material to even higher temperature during the thermoforming, e.g. at least 205° F. (96° C.) and preferably 212° F. (100° C.). However, this did not prevent shrinkage resulting in change of size which was detrimental where such containers are to be stacked for dispensing and/or where covers are to be used for closing said containers, in which case the change of size of the open mouth of said containers resulted in the cover fitting either too loosely or too tight.

An additional disadvantage of one-piece plastic foam containers resided in the fact that in such containers the only way that decorative designs, lettering, etc. could be applied to the finished surface was by holding individual containers by suitable means such as a mandrel and applying the printed material individually to the container side wall. This procedure is slow and costly and makes it prohibitive to produce such decorative containers on a commercial price basis competitive, for example, with paper containers.

It is further noted that in cups made in accordance with the prior art such as by thermoforming a sheet of plastic foam material, the thermoforming was first done at a temperature substantially greater than a later step in which the lip was formed, such as a rolling procedure, and the difference in such temperatures set up permanent stresses in the region of the lip, resulting in stress cracking.

SUMMARY OF THE INVENTION

I have found that by selecting suitable plastic foamed sheet material a container side wall may be formed from said sheet by bending a precut blank of said plastic foamed material around a suitable mandrel at a temperature between 60°–80° and preferably at normal room temperature, say 65°–75° F., and solvent sealing its overlapping end edges together. In order to solvent seal said plastic foamed sheet without damage to the foamed material, the sheet is provided with an impervious surface skin of relatively high density, which protects the foam of the sheet from being damaged by the sealing solvent and the thickness of this surface skin should be controlled so that on the one hand it will protect said foamed material and on the other hand will not unduly affect the bending properties of said sheet. The bottom of said container is made of a separate piece of plastic material which in accordance with the presently preferred embodiment is relatively thin high impact polystyrene in order to facilitate forming a downwardly extending peripheral flange which is solvent sealed to the surface skin of the inturned edge of the bottom of the foam plastic side wall by the use of said solvent. I have found it necessary to accurately control the amount of solvent applied to said sheet so as to provide sufficient solvent for sealing and not enough to penetrate the surface skin and damage the foam interior of the sheet. As a means of effecting such control, the solvent is applied in the desired pattern to the precut blank of such foam sheet material by means of an etched gravure roll; the depth of etching being of the order of 0.006 inch in a 40 lines per inch screen.

In order to maintain the desired characteristics of the foamed material, the side wall, which is wrapped around the mandrel at normal room temperature, is not subjected to heat distortion temperature thereafter, e.g., it is maintained below about 165° F.

An object of the invention is to provide plastic foam cups and the like receptacles free of the disadvantages of one-piece cups and capable of being fabricated on a production basis by methods and equipment comparable to those known in the prior art for the making of two-piece cardboard cups and the like.

This invention relates to two-piece fabricated plastic receptacles such as cups and containers whose side walls comprise foamed polystyrene or the like thermoplastic sheet material, and the method of making the same. The invention is especially useful in connection with insulated cups for drinking purposes and accordingly the invention will be described with reference to such cups by way of illustrating an embodiment of the invention.

Referring to the drawings:

FIG. 1 is a side elevation of a cup embodying the present invention;

FIG. 2 is a somewhat enlarged fragmental cross sectional view taken at 2—2 of FIG. 1 showing the side seam of said cup;

FIG. 3 is a somewhat enlarged fragmental longitudinal view taken at 3—3 of FIG. 1 showing the preferred manner of securing the bottom member and side wall member of the cup together;

FIG. 4 is a partial somewhat enlarged longitudinal sectional view taken at 4—4 of FIG. 1 showing the rolled upper edge or lip of said cup; and FIG. 5 is a plan view on a somewhat reduced scale of the precut blank from which the side wall of the cup of FIG. 1 is made showing a printed pattern of the solvent sealant along the marginal lower edge and one end edge of said blank.

Referring more particularly to the drawings, and especially FIGS. 1, 2 and 3, the cup is designated 20 and comprises in general a side wall member 21 and a bottom member 22. The side wall member 21 consists of a circumferentially folded sheet of foam plastic whose marginal edges 21a and 21b are overlapped with their contiguous faces solvent sealed to provide a side seam designated 21c. This seal is liquid-tight and further particulars as to its formation and characteristics will be described more fully hereinafter.

The bottom member 22 in the presently preferred embodiment is made of high impact polystyrene so as to facilitate the formation thereon of the downwardly extending flange 22a which is disposed between the outer wall portion 21d adjacent the lower end of the side wall 21 and the inwardly and upwardly turned end 21e of said end and said bottom flange 22a is peripherally sealed between the adjacent portions 21d and 21e of the side wall member 21, said sealing being effected by a plastic solvent so as to provide a liquid-tight end seal. The upper end of the cup 20 is provided with a lip or bead 20a (FIG. 4) which is formed by curling over the upper end of the side wall member 21. This rolled bead or lip provides not only for comfortable engagement by the lips of the user but also serves to laterally reinforce or stiffen the side wall of the cup and help maintain its shape.

In FIG. 5 is shown a plan view of the precut blank by which the side wall member 21 is formed and this blank carries a coating of a sealing solvent applied in a pattern along the lower marginal edge of said blank, as at $S^2$, and along one end edge of said blank, as at $S^1$, to provide the solvent necessary for solvent sealing the lower end seam and side wall seam of said cup. Further particulars as to the application of said solvent will be fully described hereinafter.

There are several factors which enter into the practice of the invention both as to the final article produced and the method of producing the same. The sheet material from which the side wall 21 is made must constitute in large measure foamed plastic material in order to provide the desired insulating characteristics and must be of suitable character to provide structural stiffness sufficient to support the cup when the same is filled with hot liquid such as coffee. The sheet material must be of such character as to be bent 180° along a line parallel to the cross direction without cracking or creasing and while said sheet is held at a relatively low temperature, such as normal room temperature, since this is necessary in order to effect one of the advantages of the invention, i.e., prevent shrinkage or distortion after the product is fabricated. In order to effect suitable side and bottom seams by solvent sealing, the side wall sheet material should be provided with oppositely disposed impervious film surfaces constituted of relatively dense plastic material, preferably integrally formed as a part of the sheet material, and serving to protect the substantially lower density interior of the sheet from deleterious effect of the sealing solvent.

As to the bottom member 22 of the cup, it is greatly preferable that this be made of unfoamed material and in the presently preferred embodiment in which the side wall is made of expanded high impact polystyrene, the bottom member is made of high impact polystyrene to facilitate the formation thereon of the peripheral flange to provide a convenient means of sealing the same to the end of the side wall member. I have found that the bottom member 22 made of high impact polystyrene sheet having a thickness of about 0.010 inch is strong enough to resist handling, puncturing with a spoon and the high temperature of beverages such as coffee. It is noted that the pouring of 212° F. coffee causes the bottom member to soften and deform into a slight concavity but this is not damaging and the resistance to "spooning" is still satisfactory.

By way of illustration but not by way of limitation, it is noted that the invention has been successfully carried out by the use of the following material:

A blend of 35 parts crystalline (homopolymer) polystyrene containing 5 to 6 percent pentane, 64.5 parts rubber modified polystyrene, 0.28 part sodium bicarbonate and 0.22 part citric acid is extruded through a blown film extruder having a die gap opening 0.021 inch and subsequently cooled. The crystalline polystyrene had a weight average molecular weight of 269,000, a numbers average molecular weight of 80,600 (Gel Permeation Chromatograph). The high impact styrene had a weight average molecular weight of 262,000, a number average molecular weight of 80,300. The ratio of impact to crystalline polystyrene can be varied to obtain desired properties. Likewise, impact resins having varying quantities of rubber type diene polymers can be used alone without need for blending with homopolymer styrenes.

I have found that for an 8 oz. coffee cup, satisfactory stiffness and insulation is provided by a sheet of such material having a thickness of the order of 0.040±0.008. In material of such thickness, the surface skin was of the order of 2.5 percent of the sheet thickness and in general should be held to 2 to 3 percent of the sheet thickness. The density of material of the surface skin was relatively great, e.g., approximately 66 lbs./cu.ft. with a rapid decrease in density inwardly so that the intermediate material has a low density of approximately 13 lbs./cu.ft. The cell size of said low density foam material was approximately 0.25 mm and should not exceed 0.3 mm.

The preferred method according to the present invention will now be described.

A contributory function of the properties above noted will now be touched upon.

Thickness

The thickness of the side wall foam sheet to be used is determined by several factors including insulation properties desired, economics, rigidity, ease of processing and container nesting characteristics. Cups have been formed in accordance with this invention out of foam sheet plastic material from a caliper range of 30 to 50 mils. At very low thickness, i.e., 10 mils or so, it would be expected that higher densities would be required to prevent sheet degradation due to solvent attack. With a lower thickness of this order the insulating characteristics would be lowered which would downgrade the product for extremely hot liquids. However, cups made from such low thickness material would be useful for other applications. As the calipers increase, the rim 20a tends to become more difficult to form and there will be a tendency for the cups to nest too closely. Once the thickness has been determined for a given product, it should be maintained substantially uniform to avoid processing problems.

Density

The higher the density the lesser the insulating value of a specific thickness of material. Rigidity tends to increase with density and increased density also helps minimize problems with total sheet degradation due to solvation of the plastic with the solvent used for sealing the parts. On the other hand, low densities reduce material cost and increase insulation values. It is noted that the foam plastic sheet which is employed according to this invention is not of uniform density throughout its thickness. For example, in practicing this invention, it is attempted to attain a density of polystyrene (approx. 66 lbs./cu.ft. at 23° C.) at the surfaces with a rapid change in density so that the center of the sheet has a low density of approximately 13 lbs./cu.ft. However, a center-of-the-sheet density of the order of 11–14 lbs./cu.ft. is suitable.

Flexibility

Flexibility is a function of cell size, skin thickness, overall sheet thickness, residual foaming agent (which in the preferred example above set forth is found to be 1.75 percent and which preferably should be 1 to 2.5 percent), type of polymer, and, of course, temperature. Although any one of these traits can markedly effect flexibility, interaction of these properties appears to be important and a proper balancing of them to give the desired flexibility and sheet performance.

Surface Skin

Experience in practicing the invention shows that surface skin is an especially important attribute which contributes to the ability to fabricate cups having a foam plastic side wall. Without a high density skin, the solvent applied for adhesion would tend to destroy the foam plastic sheet unless sheets of higher density and greater thickness are used and this would be a distinct disadvantage over the foam plastic sheet set forth in the preferred embodiment.

Adhesive

A solvent for the plastic material employed is used to adhere the parts together and in the present embodiment where the plastic material is polystyrene, a chlorinated solvent is preferred for safety reasons. The solvent which I have successfully used for this purpose is Methylene Chloride. If it is desired to slow down the solvent action, this may be accomplished by a mixture of Methylene Chloride and stabilized 1,1,1-trichloroethane such as made by Tect, Inc. and sold under its trade mark "VYTHENE."

In practicing my invention, I have successfully utilized a cup making machine substantially as shown and described in Albert F. Miller U.S. Pat. No. 2,125,848 issued Aug. 2, 1938 and therefore deem it unnecessary to describe the details of such machine.

A sheet of high impact polystyrene is preheated to approximately 120° F. before forming the bottoms, which are then punched and drawn to provide the downwardly extending peripheral flanges such as 22a (FIG. 3). Blanks for the side wall members 21 (FIG. 5) are punched by blanking dies from a sheet of expanded polystyrene foam of the character above described and are suitably fed past a gravure roll (not shown) which applies the solvent coating to the marginal edges $S^1$ and $S^2$ (FIG. 5). These blanks at a temperature of 60°–80° F. are then fed to forming mandrels which are provided at their lower end with a recess in which the flanged bottoms 22 are inserted and the blank is formed around such a mandrel until the opposite edges overlap as shown in FIG. 2 and pressure is applied to the overlapped marginal edges by a suitable clamp as well known in the art. It is noted at this point that wrapping of the body around the mandrel takes place within about 1 second from the time that the solvent has been applied and the end of the thus formed side wall extends beyond the end of the winding mandrel within which the flanged bottom 22 is positioned, and within about one second after the side wall of the body has thus been formed, the flanged bottom 22 is moved in an axial direction so as to peripherally engage the solvent seal line $S^2$ which is of a width substantially equal to twice the depth of the flange 22a of the bottom member and the marginal end 21e of the side wall member 21 is then folded up inwardly so that the solvent coating $S^2$ is brought into peripheral proximity to the inner face of the bottom flange 22a and the lower end 22e is progressively folded inwardly and then pressed radially outwardly under substantial pressure so as to firmly squeeze the side wall portions 21d and 21e together against the contiguous peripheral surfaces of the bottom flange 22a.

The foam content of the side wall member 21 intermediate the skin surfaces thereof permits sufficient compressability to compensate for the overlapped edges in the side seam, which is substantially thicker than the remainder of the side wall (FIG. 2) to assure providing a liquid-tight seal which is effected by the solvent coating $S^2$ which provides the peripheral end seal of the cup. As heretofore pointed out, the amount of solvent applied along the seal lines $S^1$, $S^2$ of the blank 21 is controlled by limiting the etching of the gravure roller to a depth of about 0.006 inch with a line screen of about 40 lines per inch. To facilitate the turning in of the lower edge of the cup by the curling tools applied, mineral oil is applied to the bottom edge of the body shell so as to lubricate the bottom curling tools.

After the bottom is thus secured in position, the body comprising the side wall member and bottom member is completely assembled and the only thing remaining to be done is the formation of the rimming member 20a. To accomplish this the assembly is blown into a cup holder turret and the top edge of the cup is heated with a medium velocity air heated to about 500° F., followed in the next station with a 525° F. heated non-contacting plug and this preconditioning is followed by a rotary rim forming tool which partially forms the folded rim 20a (FIG. 4) and the cup is then moved to a succeeding station where a second rim forming tool engages the cup to give the rim its final shape and dimensions.

Except for the localized heating of the top edge of the cup to aid in forming the rim 20a, the remainder of the cup comprising the assembled side wall and bottom member is maintained at a temperature well below the heat distortion temperature (e.g., below 165° F.) so as to maintain the foamed sheet characteristics substantially unchanged from the state present in the sheet at the time that the blanks are cut therefrom. This lack of applying distortion heat during fabrication and refraining from highly compressing the material of the side seam avoids localized stresses and maintains circumferentially continuous insulation. Additionally, by refraining from heating the body no cooling period is necessary.

Having thus described the invention with particularity with reference to the presently preferred embodiment thereof, it will be obvious to those skilled in the art, after understanding the invention, that various changes and modifications may be made therein without departing from the spirit and scope of the invention, and I aim in the appended claims to cover such changes and modifications as fall within the scope of the invention.

What I claim is:

1. A method of making a two-piece plastic container which comprises the steps of selecting a sheet of foamed plastic material of substantially uniform thickness and having impervious skins of relatively high density approaching that of the basic unfoamed plastic on its opposite faces and an intermediate body of foamed plastic having a relatively low density of the order of 11-14 lbs./cu.ft., the cell size of the foamed plastic of said intermediate body being from about 0.2 mm. to about 0.3 mm. and the thickness of each of said impervious skins being on the order of from about 2 percent to about 3 percent of said uniform thickness of the sheet, cutting therefrom a blank for the side wall of said container, applying a solvent seal pattern along a marginal area at the bottom and end of said blank, folding said blank, at a temperature below the heat distortion temperature of said plastic, around a mandrel to bring its opposite ends into overlapping position with said solvent therebetween, pressing said overlapped ends together with sufficient pressure to solvent seal the ends together to provide a container side seam without substantially increasing the density of said intermediate body of said foamed plastic, and solvent sealing a bottom member to the lower end of said formed side wall to provide a liquid-tight seal, said characteristics of said foamed plastic sheet material being maintained substantially unchanged during all of said steps.

2. The method as set forth in claim 1, in which the plastic material is foamed polystyrene, the sheet thereof having a thickness of from about 0.030 inch to about 0.050 inch, said impervious skins of said sheet having a density on the order of about 66 lbs./cu.ft., and said blank is folded while at a temperature of between 60° and 80° F.

3. The method as set forth in claim 2 which further comprises forming said bottom member by preheating a sheet of high impact polystyrene having a thickness of the order 0.010 inch to a temperature of about 120° F. and punching and forming said bottom member therefrom.

4. The method as set forth in claim 1, in which said foamed plastic material comprises crystalline (homopolymer) polystyrene containing from about 1 percent to about 2.5 percent residual pentane foaming agent.

5. The method as set forth in claim 1 in which the solvent is a chlorinated solvent and is applied to said blank by an etched gravure roll on which the etching is about 0.006 inch deep with a line screen of about 40 lines per inch and said container side seam is completed within about one second after the solvent seal pattern is applied.

6. The method as set forth in claim 1 which further comprises the steps of supporting the assembled body comprising the side wall member and bottom member in a container holder, preconditioning the top edge of said assembled body by subjecting it to a medium velocity flow of air heated to about 500° F. and thereafter to a non-contacting plug heated to a temperature of about 525° F. and, after thus preconditioning said edge, partially forming a beaded lip and thereafter completing the lip to its final shape and dimensions.

* * * * *